United States Patent [19]

Hoffman

[11] 4,359,763
[45] Nov. 16, 1982

[54] FLOPPY DISC DRIVE

[75] Inventor: Paul R. Hoffman, Exton, Pa.

[73] Assignee: Exxon Research and Engineering Co., Florham Park, N.J.

[21] Appl. No.: 174,921

[22] Filed: Aug. 4, 1980

Related U.S. Application Data

[63] Continuation-in-part of Ser. No. 19,901, Mar. 12, 1979, Pat. No. 4,275,426.

[51] Int. Cl.³ .................... G11B 5/016; G11B 5/54; G11B 21/08
[52] U.S. Cl. ............................ 360/99; 360/78
[58] Field of Search ............... 360/99, 97, 98, 86, 360/105, 133, 135, 106, 78; 346/137; 310/49 R, 49 A, 268, 263; 318/138, 696

[56] References Cited

U.S. PATENT DOCUMENTS

| Re. 29,380 | 8/1977 | Castrodale et al. | 360/99 |
|---|---|---|---|
| 3,500,363 | 3/1970 | Shill | 360/97 |
| 3,589,485 | 6/1971 | Kajitani et al. | 360/78 |
| 3,646,261 | 2/1972 | Kinjo et al. | 360/106 |
| 3,683,248 | 8/1972 | Kobayashi et al. | 274/39 A |
| 3,881,184 | 4/1975 | Koepcke et al. | 360/78 |
| 3,886,595 | 5/1975 | Swaim et al. | 360/78 |
| 3,975,768 | 8/1976 | Jacques et al. | 360/99 |
| 3,988,024 | 10/1976 | Watanabe et al. | 310/237 |
| 4,146,912 | 3/1979 | Kureja | 390/99 |
| 4,161,004 | 7/1979 | Dalziel | 360/106 |
| 4,166,284 | 8/1979 | Daniels | 360/106 |
| 4,185,309 | 1/1980 | Feldstein et al. | 360/97 |
| 4,228,387 | 10/1980 | Brown | 360/99 |

Primary Examiner—Alfred H. Eddleman
Attorney, Agent, or Firm—Kenneth R. Schaefer

[57] ABSTRACT

An improved floppy disc drive, with direct disc rotational drive, characterized by a step motor having a plurality of pole pairs with pole pieces fabricated from a portion of the drive housing at predetermined locations, and a disc having radial webs and positioned so that pairs of such radial webs align one pair at a time with successive ones of successively energized pole pairs, thereby providing a highly efficient and compact disc drive motor. The drive assembly also contains a read head drive with a step motor and transmission means for driving the read head radially with respect to the floppy disc. Means are provided which enable clutch operation to engage the disc with the drive only when the disc is properly seated within the drive assembly.

12 Claims, 8 Drawing Figures

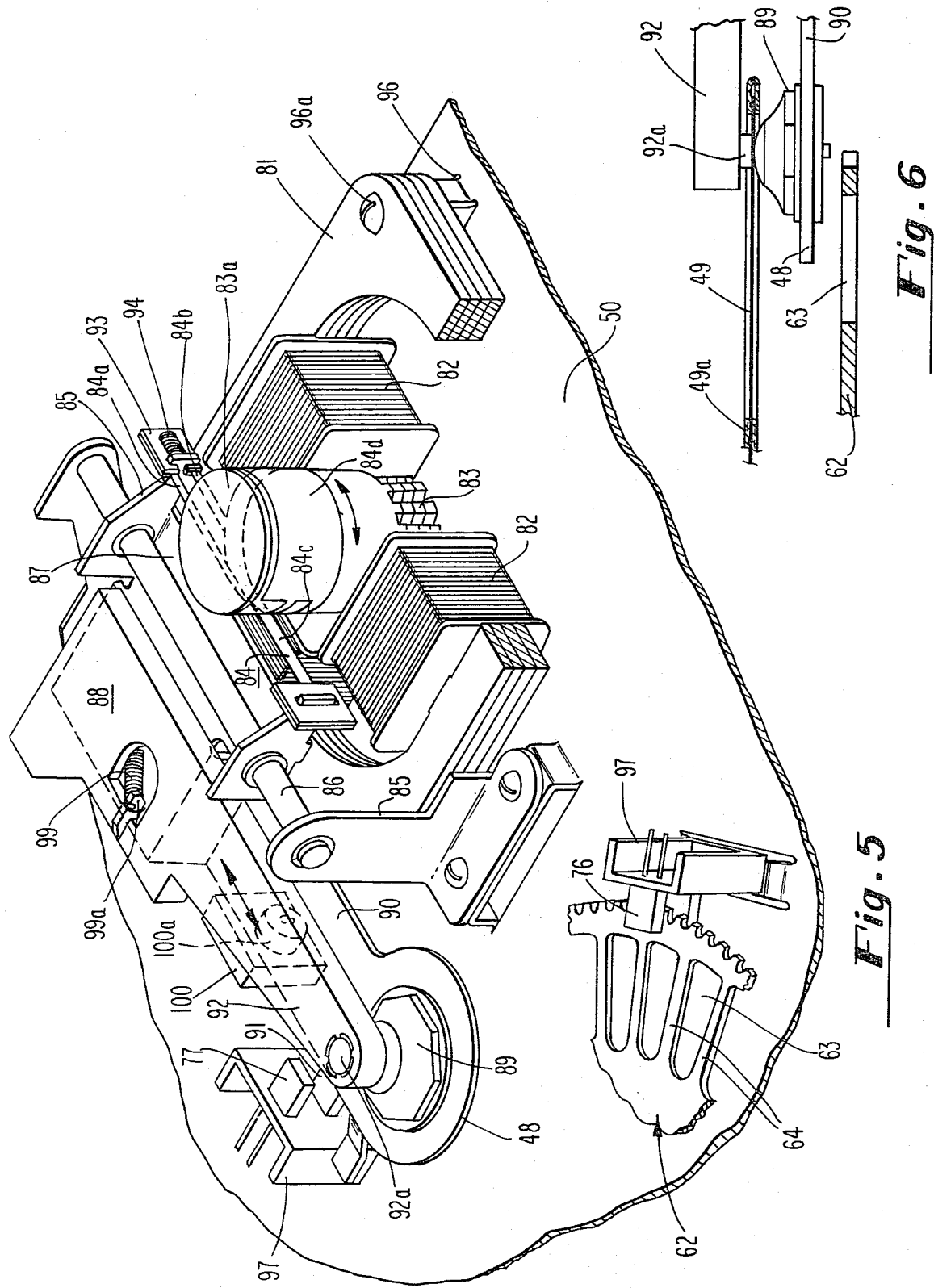

FLOPPY DISC DRIVE

RELATED APPLICATIONS

This is a continuation-in-part of copending application Ser. No. 19,901 filed Mar. 12, 1979, now U.S. Pat. No. 4,275,426.

BACKGROUND OF THE INVENTION

This invention lies in the field of floppy disc drive systems and, in particular, of a disc drive with a direct rotational step motor drive. This invention also relates to stepper motor construction.

The floppy disc is now a widely accepted storage medium and, in particular, has become almost universally employed in office equipment and word processing devices. The floppy disc is a thin Mylar platter, either 8 inches in diameter in the standard size or 5¼ inches in diameter for the minifloppy. The smooth surface of the disc is coated with a magnetic oxide, and is housed in a square paper envelope having an opening or "window" through which the disc is exposed to the read-write head. Another smaller window provides access for detecting segment reference markings. The floppy disc can hold a substantial amount of information, i.e., a standard 8 inch disc is capable of holding a megabite. Associated with the floppy disc is a disc drive which is required to rotate the disc at a specific speed and to provide automated control of the read and write operations. Every apparatus which uses the floppy disc must necessarily have the associated floppy disc drive. The drives are necessarily relatively complex and have been relatively expensive. In view of this, and also in view of the projection for substantially increased use of floppy discs in the near future, it is important to provide an improved floppy disc drive which is simplified, less expensive, and is capable of being packaged in a smaller volume.

A floppy disc drive incorporating a rotary stepper motor drive is disclosed in copending application Ser. No. 56,987 filed July 12, 1979 now abandoned in favor of continuation application, Ser. No. 241,974, filed Mar. 9, 1981. A rotary stepper motor typically employs a plurality of pole positions symmetrically placed about the axis of the motor. Where efforts are made to reduce the overall height of the disc drive, the magnetic storage medium necessarily becomes more closely positioned to the magnetic fields which drive the motor. These magnetic fields create noise which can adversely affect the reading and writing of data on the magnetic storage medium.

SUMMARY OF THE INVENTION

It is an object of this invention to provide a stepper motor having a very small axial dimension.

It is also an object of this invention to provide a floppy disc drive which is an improvement over prior art disc drives in terms of reduced complexity, reduced cost and smaller package volume.

It is another object of the invention to provide a direct rotational floppy disc drive having a disc type step motor.

It is another object of this invention to provide a simplified step motor of relatively flat thin construction for use in providing a rotational drive for a floppy disc drive or the like.

It is another object of this invention to provide a simplified step motor having an improved armature design.

It is another object of this invention to provide a floppy disc drive having a simplified step motor comprising pole pieces fabricated integrally with a housing plate of the disc drive housing.

It is another object of this invention to provide a floppy disc drive having an improved read head drive mechanism.

It is another object of this invention to provide a floppy disc drive having a disc motor characterized by having a relatively thin volume.

It is another object of this invention to provide a floppy disc drive which does not impair the reliability of magnetic reading and writing on the magnetic recording medium.

It is a further object to provide a disc housing designed to enable operation of the disc drive only when the floppy disc has been fully and properly entered into the drive.

In accordance with these and other objects of the invention, a stepper motor comprises a rotor having an axis of rotation and a plurality of pole positions arranged in an arcuate path with coils associated with the pole positions for selective energization thereof.

In accordance with one important aspect of the invention, the pole positions are arranged assymetrically with respect to the axis of rotation so as to leave a substantial void.

In accordance with another important aspect of the invention, the motor includes a base plate having a plurality of tabs integrally formed therewith to form pole pieces at the pole positions.

In the preferred embodiment of the invention, a floppy disc drive employs the aforesaid step motor and the pole pieces are formed integrally with the base plate of the housing of the drive, and a disc armature having a predetermined number of radial web elements of a thickness corresponding to the pole pieces and mounted relative to the pole pieces to provide a step motor drive when the pole pieces are sequentially energized. The construction which utilizes pole pieces integrally formed from the base plate and the flat disc armature enables a simple, efficient and relatively thin motor construction for rotation of the floppy disc. Since the pole pieces of the floppy disc drive are assymetrically positioned with respect to the axis of the motor so as to provide an area having a substantial void of pole pieces, a read/write head may move along a path across the void without magnetic interference at the head. The disc drive is also characterized by a read/write head drive utilizing another step motor and a spring loaded motor for positioning the read/write head. A unique clutch handle design prevents operation of the floppy disc drive except when the disc has been properly seated into the drive housing.

BRIEF DESCRIPTION OF THE DRAWINGS

FIG. 5 is a perspective view of a portion of the floppy disc head drive mechanism shown in FIG. 2 with a portion of the stator cut away.

FIG. 6 is an elevational view taken along line 6—6 of FIG. 2.

DESCRIPTION OF THE PREFERRED EMBODIMENTS

Figure 1:
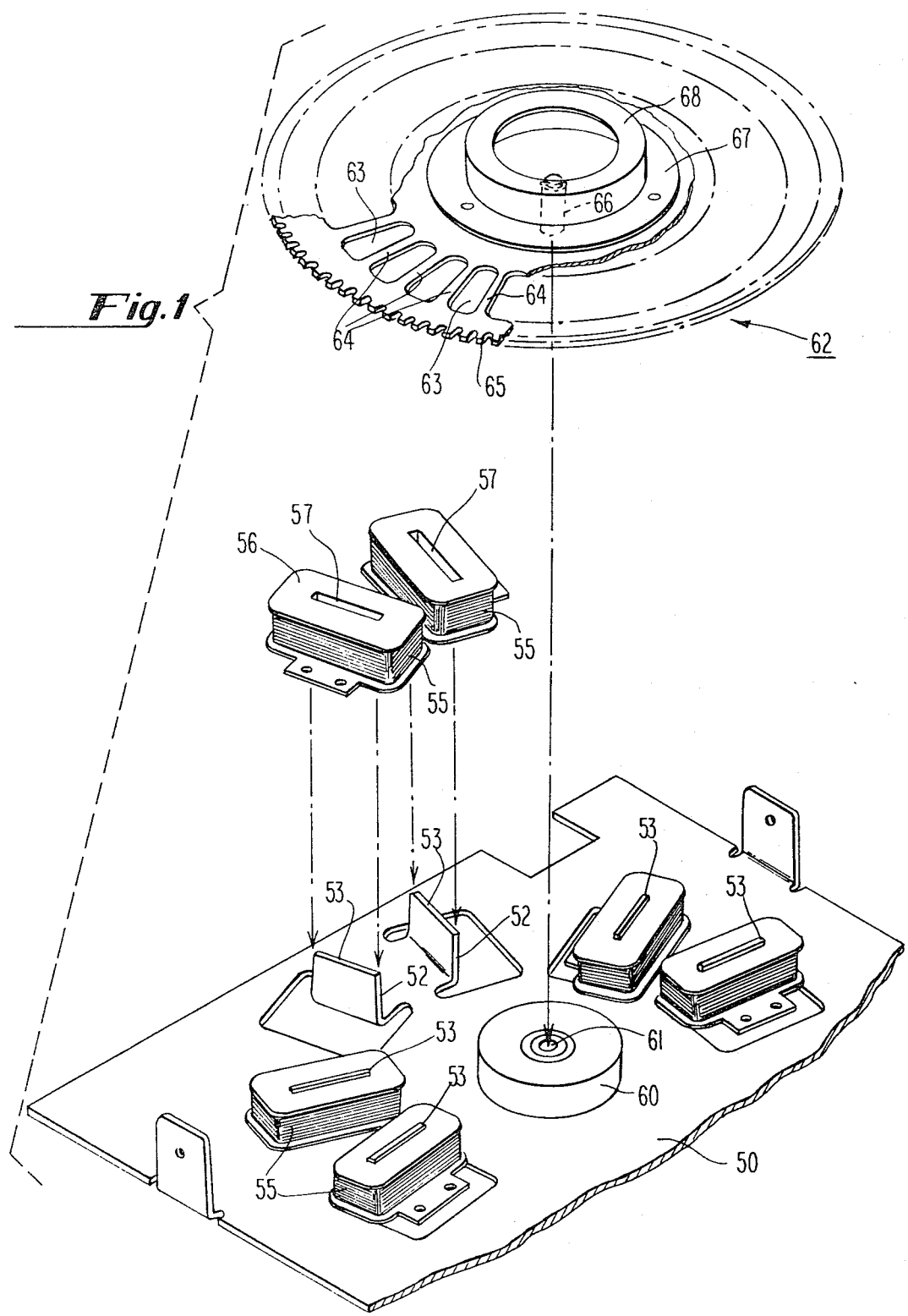
FIG. 1 is a split perspective view of the floppy disc drive, showing a motor stator formed of coil elements interfitted with pole pieces which are formed integrally with a base plate of the disc drive housing, and a disc armature having radial openings therein designed to provide webs spaced in predetermined relation to the pole pieces, to provide a step motor.

Referring now to the drawings, FIGS. 1 and 5 show the base plate 50 of the overall disc housing, and motor disc 62, with the relationship of the base plate and disc being indicated. Base plate 50 has tabs 52 assembled therefrom by cutting the plate and bending them as shown. For the three pole pair motor of the preferred embodiment of this invention, there are three pairs of pole pieces 52, each of which has associated therewith a coil element 55. Coil element 55 comprises a substantially rectangularly wound coil with a bottom insulating piece and a top insulating piece 56 having a substantially rectangular slot 57. When coil element 55 is dropped onto pole piece 52, the upper edge 53 of pole piece 52 extends through the inner cavity of the coil 55 and just through rectangular opening 57. As shown, these three pole pairs are placed radially about a center hub 60 which has an axial receiving opening 61 at the center thereof for receiving pin 66 on the bottom of disc 62. The remainder of the housing is conventional, and provides for positioning the disc to be rotated and to be in proper registration with the read/write head 48.

The armature disc, as shown generally at 62, comprises a flat disc portion having radial openings 63 spaced to provide radial webs 64 therebetween. The webs 64 are positioned so that one pair of them at a time can align exactly with one pair of pole pieces 53. That is, the number and the spacing of opening 63 is such that only one pair of webs (not adjacent in the illustration of FIG. 2) aligns with, or is in registration with a given pair of pole pieces 53 at any time. Thus, in practice, with the disc 62 mounted and centered with respect to the pole pieces, a single pair of webs 64 may align precisely with a pair of pole pieces 53. The pair of pole pieces with which the disc is aligned will be that pair which has its corresponding coils 55 energized, according to well known principles. If such a coil pair is then deenergized, and the next pair of coils is energized, the disc is caused to rotate so that a pair of webs 64 aligns with the pole pieces 53 of the next pole pair. In this way, the disc can be continually rotated by sequentially energizing successive coil pairs 55, causing successive alignment with respective pairs of pole pieces 53.

It will be noted that the three pairs of pole pieces 53 are assymetrically positioned with respect to the axis A of the motor so as to create a void in the area V where there are no pole pieces. This void is of the utmost importance because it provides an area in which magnetic interference can be minimized so as to allow a read/write head 48 to move in close proximity to the armature disc 62 adjacent the void without adversely affecting the magnetic reading or writing on the floppy disc 49 as shown in FIG. 6.

Continuing with the detail of FIG. 1, armature disc 62 as mounted thereon a plate 67 which carries a concentric elevated drive ring 68, against which the floppy disc is caused to be pressed when the disc drive clutch is engaged. Note that the disc 49 when pressed against the ring 68 will be in very close proximity to the armature disc 62 which is desirable to minimize the height of the floppy disc drive as shown in FIG. 6. It will also be noted that the distance between the disc 49 and the disc 62 is relatively small, i.e., the disc 49 is immediately adjacent the disc 62, and this distance is not substantially greater than the overall thickness of the head 48. The clutch mechanism is a conventional mechanism as utilized in floppy disc drives, and accordingly is not described. The axial pin 66 which extends downward from the bottom surface of disc 62 is positioned to be seated in the bearing 61, for center mounting of the disc relative to the pole pieces.

Other details of the motor and the motor control, whereby the pole pieces are successfully energized, are not disclosed since there are well known in the art. However, one important feature of the floppy disc drive which was not heretofore known is the construction whereby the pole pieces are individually formed from the base plate 50, and are spaced relative to the center opening 61 so as to provide step-motor type registration with the webs 64 of the disc, thereby enabling step motor operation. Another feature not heretofore known is the assymmetrical positioning of the pole pieces 53 so as to create the void V such that the head 48 may move in close proximity to the armature 62.

Figure 2:
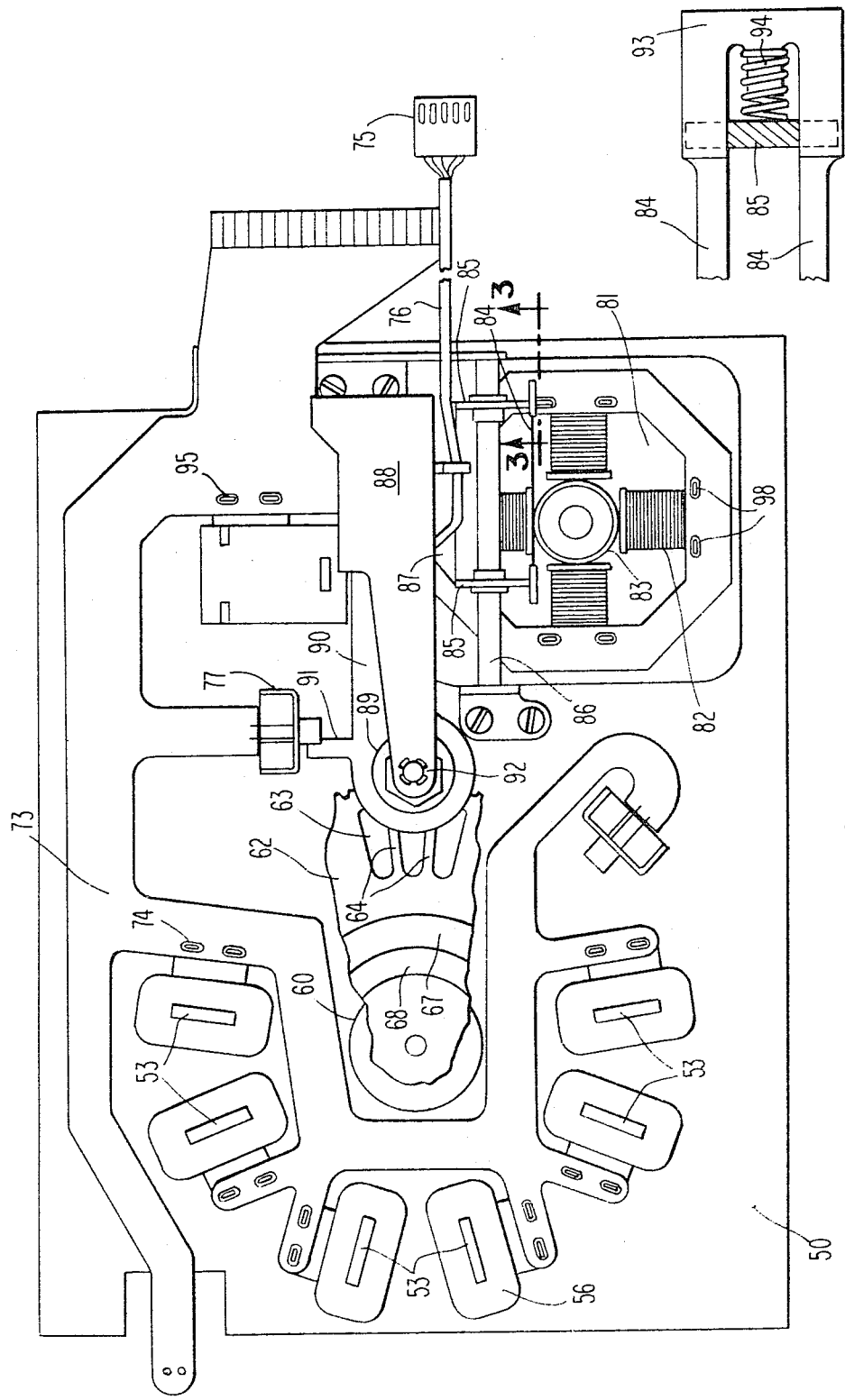
FIG. 2 is a plan view in schematic form, showing the positioning of the floppy disc drive and the read head drive on the housing base plate.

Disc 62 has, along its outer periphery, timing teeth or notches 65. As illustrated, there are a plurality of notches for each web. A photodetector 76, shown in FIGS. 2 and 5, is positioned to detect each notch, and basic control signals are generated from each such detected notch. In the preferred embodiment, each time a notch is detected, the motor control is stepped and a next pole pair is energized. Thus, for every third notch of rotation a given pole pair is energized. For a total of n notches around the disc, each pole pair is energized n/3 times per disc revolution.

Referring now to FIGS. 2 and 5, there is shown a diagram which indicates the positioning of the read head drive relative to the disc drive. A flat ribbon type connector 73 is positioned on the base plate 50 as shown in FIG. 2 to provide circuit connections to the motor and detector locations which require electric coupling. For example, terminals 74 are provided for energization of each coil 55, as controlled by a conventional sequencing control. Connections are also shown to photocell the detector 76 as well as a photodetector 77 which detects the position of the head 48. Only a portion of the disc 62 is shown for purposes of illustration, the important point being that the webs 64 have radial lengths which correspond precisely to the radial length of pole pieces 53, such that at any time a given pair of webs 64 can register exactly with a given pair of pole pieces 53.

Seen in the lower right hand portion of FIG. 2, there is another step motor 81 illustrated as having four pole pieces 82 and corresponding connection points 98. The rotor 83 has longitudinal notches, shown in FIG. 5, and an upper pulley portion 83a which is in friction contact with a band 84 which is tightly held at each end by elements 85. Elements 85 in turn ride on fixed axle 86, and carry coupling member 87 which in turn carries upper read head member 88 and lower read head member 90 which are attached thereto. The rotational movement of rotor 83 is translated into horizontal movement by spring loaded member 84, thereby carrying the upper and lower read head members back and forth radially with respect to the floppy disc (not shown in FIG. 2), for positioning of the read head relative to the many tracks thereof. Motor 81 operates at 100 steps per revolution, but since only 40 steps are used, the rotor is required to make 4/10 of a turn in order to provide the desired radial movement of the read head. It is to be noted that the floppy disc, when entered into the total assembly, is positioned between a circular disc 89 which is at the end of member 90 and which carries the read head, and upper arm 92 at the end of member 88, which carries a felt pad 92a. An electromagnet assembly, indicated at 112 in FIG. 2 connected to the circuitry on 73 through terminal points 95, is energized to push the pad against the floppy disc which in turn is pressed into contact with the read head, whenever the reading or writing operation is desired. The electrical connections to and from the read head are carried by the wires designated at 75a, which connect to connector element 75 as shown.

Figure 3:
FIG. 3 is a detailed view along lines 3—3 showing the spring loaded feature of the transmission means for coupling the read head motor with the read head assembly.

Turning to FIG. 3, there is a detailed view of the means of maintaining spring loaded contact between spring 84 and pulley 83. Band 84 terminates, at the right hand end as seen in FIG. 2, and a U-shaped section 93 which extends beyond element 85, and has a center portion which carries a spring 94. Spring 94 maintains band 84 in an extremely tight condition, so that it is at all times maintained in good frictional contact with the upper pulley portion of rotor 83.

Referring to FIG. 5, the band 84 is shown in somewhat more detail as comprising a bifurcated section including portions 84a and 84b which partially wrap around the pulley portion 83a at a surface 84d. The band 84 also includes a portion 84c which also wraps around the pulley portion 83a at the surface 84d. FIG. 5 also shows the stator of the motor 81 as mounted on a pedestal 96 by means of a screw 96a.

Still referring to FIG. 5, additional details concerning the head are shown. A block 100 carries a pulley 100a for guiding the member 90 across the disc 49 shown in FIG. 6. A spring 99 attached to a bracket 99a biases the head member 88 downwardly toward the disc 49. As also shown in FIG. 5, member 90 includes a projection 91 which extends outwardly into proximity with the detector 77 so as to detect the outermost position of the head 48 which is subsequently described in greater detail. The detector 77 is mounted on a bracket 97. A similar bracket 97 is utilized to mount the detector 76.

Referring to FIG. 6, it will be seen that the disc 49 is mounted within an envelope. More specifically, disc 49 is mounted within a jacket 49a with a portion exposed in accordance with conventional practice in the art.

Figure 4A:
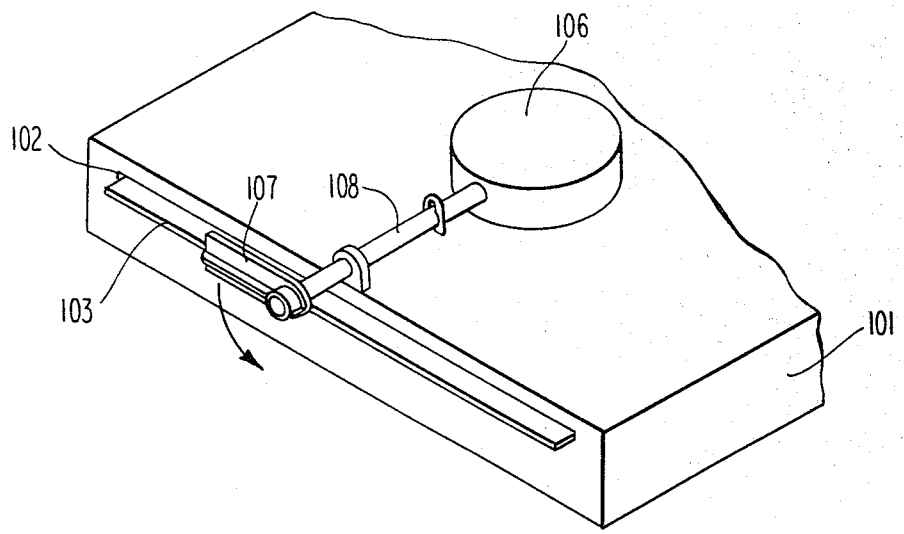
FIG. 4A is a perspective view showing the floppy disc housing and the floppy disc entered therein, and the relationship of the clutch handle to the front edge of the floppy disc which has been inserted into the disc drive.
Figure 4B:
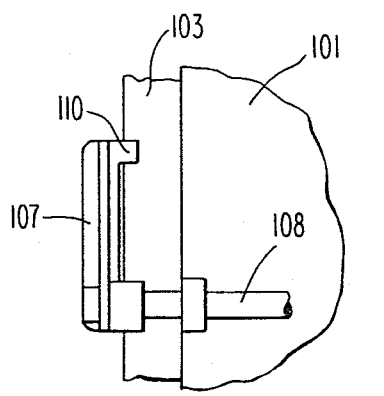
FIG. 4B is a detailed view showing the relationship of the clutch handle to the floppy disc when it has not been fully entered into the disc drive assembly.
Figure 4C:
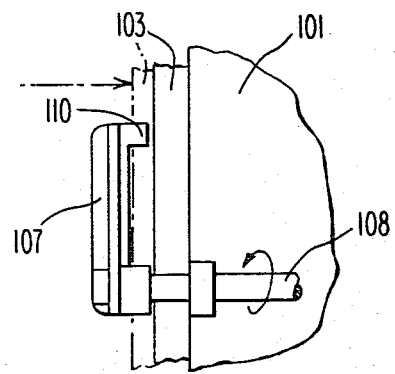
FIG. 4C is a detailed view showing the relationship of the clutch handle to the floppy disc when it has not been fully inserted into the disc drive assembly.

Referring now to FIGS. 4A-4C, there is illustrated the clutch handle arrangement of this invention which ensures against clutch engagement of the floppy disc unless the floppy disc is fully and properly seated within the disc assembly 101. The clutch, indicated at 106, is a conventional clutch which contains a conical member (not shown) which seats down into the central opening of the floppy disc and causes it to be pressed into contact with drive ring 68 of the disc. The clutch is operated by a handle 107, seen in FIG. 4A, which connects to clutch 106 through an axle 108 and an appropriate camming mechanism not shown. The handle, which is at the 9 o'clock position (shown in FIG. 4A) is above the disc, can be rotated downward for clutch engagement only if the disc 103 is fully inserted into the opening 102, such that the disc is properly centered. As shown in FIG. 4B, if the disc 103 is not fully inserted, the forward extended portion 110 of handle 107 does not clear the disc, and clutch engagement is not possible. As seen in FIG. 4C, when the disc has been fully inserted, portion 110 clears the proximal edge of the disc, enabling rotation of the handle and clutch engagement.

Another unique feature is the means of detecting when the read head is positioned in registration with the zero track of the floppy disc. Read head member 90 (FIG. 2) carries an outward extension 91 which intercepts fixed photodetector 77 when and only when the read head is positioned over the zero track. The detector output is carried through connector 73 to the electronic control board (not shown) so that the drive always shows when the read head is positioned at the zero track.

The word void has been used in describing the assymetrical positioning of the poles of a rotary stepper motor embodying the invention. This term has been used to emphasize the substantial assymetry of the poles which provides a substantial area without poles so as to permit the head 48 to remain spaced a substantial distance from the poles for all portions of the head.

In operation, there is provided a highly efficient and relatively compact disc drive. The disc drive motor assembly enables a thinner motor than previously available, when reduced to the size of the overall drive package. Construction is also simplified, resulting in less expense.

It will be appreciated that the improved stepper motor construction described herein may have other applications which are unrelated to floppy disc drives.

What is claimed is:

1. A floppy disc drive assembly having a disc drive for rotating a floppy disc at a predetermined speed and a recording head drive for positioning a recording head relative to said rotated disc, characterized by a recording head drive means comprising a step motor for providing rotational movement, and a coupling mechanism for coupling said recording head to said step motor so as to provide movement to said recording head which is radial relative to said floppy disc, said coupling mechanism comprising rotatable drive means coupled to said stepper motor, band means having ends substantially fixed relative to the recording head and movable relative to said stepper motor and an intermediate portion wrapped around said drive means for producing linear motion, and spring means for holding said band in friction contact with said drive means under spring tension, wherein said recording head has integrally connected thereto a zero track detector for detecting when said recording head is at a zero track position and wherein said disc drive comprises a motor having a plurality of stator poles, each of said poles having a pole piece formed from and an integral part of the disc drive assembly housing.

2. The floppy disc drive assembly as described in claim 1, comprising clutch means for engaging a floppy disc with said disc drive, said clutch means comprising a clutch handle configured such that it is operative only when the floppy disc is fully inserted in the floppy disc drive assembly housing.

3. A floppy disc drive assembly comprising:
   a rotary stepper motor including a stator having a plurality of pole positions assymmetrically positioned with respect to the axis of said motor so as to provide an enlarged area between two adjacent ones of said pole positions having a substantial void of pole positions and a rotor for closing magnetic flux paths at said pole positions and adapted to rotate about said axis and cooperate with said pole positions;
   means coupled to said motor for rotatably supporting a magnetic recording disc; and
   head means adapted to move radially with respect to said disc along a substantially linear path, said linear path extending across said void.

4. The floppy disc drive assembly of claim 3 wherein each of said pole positions includes at least one pole piece.

5. The floppy disc drive assembly of claim 4 comprising a magnetic recording disc support surface carried by said rotor for supporting the magnetic recording disc a distance from said rotor substantially less than the overall height perpendicular to said magnetic recording disc of each said pole piece.

6. The floppy disc drive assembly of claim 3 further comprising a magnetic recording disc support surface carried by said rotor for supporting the magnetic recording disc immediately adjacent said rotor.

7. The floppy disc drive assembly of claim 3 wherein each of the pole positions includes a pair of pole pieces.

8. The floppy disc drive assembly of claim 3 further comprising a base plate having a plurality of tabs formed integrally therewith and coils associated with said tabs to form pole pieces at said pole positions.

9. The floppy disc drive of claim 8 wherein said rotor comprises a disc armature, said disc armature having a predetermined number of radial web elements of dimensions corresponding to the spacing of said pole pieces at predetermined angular positions.

10. A floppy disc drive assembly comprising:
    a base plate having a plurality of tabs integrally formed with the base plate in an arcuate array;
    a plurality of coils associated respectively with said tabs to form pole pieces of a rotary stepper motor, wherein said pole pieces are assymmetrically arranged with respect to the axis of rotation for the motor so as to leave a void sector between two adjacent ones of said pole pieces which is greater than that between others of said pole pieces; and
    a rotor having magnetic elements adapted to close flux paths between selectively energized pole pieces.

11. The floppy disc drive assembly of claim 10 further comprising a head adapted to magnetically communicate with the magnetic recording disc, said pole pieces assymmetrically arranged so as to leave a void across which said head is adapted to travel.

12. A stepper motor comprising:
    a base plate having a plurality of tabs integrally formed therewith;
    a plurality of coils associated respectively with said tabs so as to form stepper motor pole pieces; and
    an actuator including a plurality of magnetic elements adapted to cooperate with said tabs to selectively close flux paths between selectively energized pole pieces, wherein said motor is of the rotary type, said actuator comprising a rotor having an axis of rotation and said tabs are arranged in an arcuate path travelled by said rotor, said rotor comprising a rotatably mounted disc, said plurality of magnetic elements comprising a plurality of radially extending web elements, and said pole pieces are assymetrically arranged with respect to the axis of rotation of said rotor so as to leave a sector between two adjacent ones of said pole pieces which is greater than that between others of said pole pieces.

* * * * *